United States Patent
Cho

(10) Patent No.: US 8,447,925 B2
(45) Date of Patent: *May 21, 2013

(54) HOME STORAGE DEVICE AND SOFTWARE INCLUDING MANAGEMENT AND MONITORING MODULES

(75) Inventor: Byungcheol Cho, Seochogu (KR)

(73) Assignee: Taejin Info Tech Co., Ltd., Seoul (KR)

( * ) Notice: Subject to any disclaimer, the term of this patent is extended or adjusted under 35 U.S.C. 154(b) by 311 days.

This patent is subject to a terminal disclaimer.

(21) Appl. No.: 12/916,950

(22) Filed: Nov. 1, 2010

(65) Prior Publication Data

US 2012/0110261 A1    May 3, 2012

(51) Int. Cl.
*G06F 12/00*    (2006.01)
*G06F 3/00*    (2006.01)

(52) U.S. Cl.
USPC ............... 711/114; 711/154; 710/15; 710/18

(58) Field of Classification Search
USPC ...................................... 711/114; 710/15, 18
See application file for complete search history.

(56) References Cited

U.S. PATENT DOCUMENTS

| | | |
|---|---|---|
| 7,634,615 B2 | 12/2009 | Sutardja |
| 7,698,351 B1 | 4/2010 | Hing et al. |
| 7,702,848 B2 | 4/2010 | Sutardja et al. |
| 8,239,557 B2 * | 8/2012 | McCune et al. ............... 709/230 |
| 2006/0047906 A1 * | 3/2006 | Umemura ....................... 711/114 |
| 2007/0186039 A1 | 8/2007 | Nam |
| 2008/0059698 A1 | 3/2008 | Kabir et al. |
| 2008/0168304 A1 | 7/2008 | Flynn et al. |
| 2009/0204758 A1 | 8/2009 | Luning |
| 2009/0327211 A1 * | 12/2009 | McCune et al. ................... 707/1 |
| 2010/0073860 A1 | 3/2010 | Moriai et al. |
| 2010/0100664 A1 | 4/2010 | Shimozono |
| 2010/0199036 A1 | 8/2010 | Siewert et al. |
| 2010/0281230 A1 | 11/2010 | Rabii et al. |

OTHER PUBLICATIONS

Abstract KR20100036528, Apr. 8, 2010, Taejin.
Abstract KR20100071858, Jun. 29, 2010, Taejin.
Abstract KR20100114697, Oct. 26, 2010, Taejin.

* cited by examiner

*Primary Examiner* — John Lane
(74) *Attorney, Agent, or Firm* — Saliwanchik, Lloyd & Eisenschenk

(57) ABSTRACT

In general, embodiments of the present invention provide a home storage system. Specifically, in a typical embodiment, the home storage system includes a graphical user interface for graphically accessing features of the home storage system; an internal storage management and monitoring module for managing and monitoring a set of semiconductor storage device (SSD) memory units and a set of hard disk drive (HDD) memory units within the home storage system; an external interface management and monitoring module for managing and monitoring network connectivity of the home storage system; and a portable storage management and monitoring module for managing and monitoring at least one type of external memory coupled to the home storage system.

14 Claims, 7 Drawing Sheets

HOME STORAGE DEVICE AND SOFTWARE INCLUDING MANAGEMENT AND MONITORING MODULES

CROSS-REFERENCE TO RELATED APPLICATION

This application is related in some aspects to commonly-owned and co-pending patent application Ser. No. 12/848,281, entitled "Hybrid RAID Controller", which was filed Aug. 2, 2010, the entire contents of which are herein incorporated by reference.

FIELD OF THE INVENTION

The present invention relates to home storage systems. Specifically, the present invention relates to PCI-Express-based hybrid RAID controlled home storage systems.

BACKGROUND OF THE INVENTION

As the home storage device market continues to grow, there is an increasing need towards improving speed, storage size, and functionality. To this extent, several approaches have been attempted:

U.S. Pat. No. 7,698,351 allegedly discloses a GUI architecture that is configured to enable efficient management of resources in a storage system environment.

U.S. Patent Application 20100199036 allegedly discloses a system and method for tiered management levels of a RAID storage system. Data is moved between higher performing and more expensive storage device tiers and lower performing and less expensive data device tiers based upon the level of access efficiency needed for the data and related applications.

U.S. Patent Application 20100100664 allegedly discloses a storage system configured to achieve read-access response time improvement.

U.S. Patent Application 20100073860 allegedly discloses an apparatus that includes multiple memory modules, a module controller, a control board, and an interface device.

U.S. Patent Application 20090204758 allegedly discloses systems and methods for asymmetric RAID devices that include a RAID controller and a RAID volume. The RAID volume includes tiered device sets which have different levels of access speeds.

U.S. Pat. No. 7,702,848 allegedly discloses a data storage system that employs low power disk drives to cache data to and from high power disk drives to reduce power consumption and access times. A host device may be used to communicate through a memory interface such as a flash memory interface.

U.S. Pat. No. 7,634,615 allegedly discloses a data storage system that employs low power disk drives to cache data to and from high power disk drives to reduce power consumption and access times. A host device may be used to communicate through a memory interface such as a flash memory interface and lower power disk drives (LPDD).

U.S. Patent Application 20080168304 allegedly discloses an apparatus, system, and method for data storage. A parity-mirror module is used during the write operation to create redundant storage.

U.S. Patent Application 20080059698 allegedly discloses a method for automating RAID configuration on data storage media. A data structure is installed onto a data storage medium which creates a default policy using the data storage medium and is recognizable by a controller.

Unfortunately, none of these approaches leverage hybrid RAID functionality.

SUMMARY OF THE INVENTION

In general, embodiments of the present invention provide a home storage system. Specifically, in a typical embodiment, the home storage system includes a graphical user interface for graphically accessing features of the home storage system; an internal storage management and monitoring module for managing and monitoring a set of semiconductor storage device (SSD) memory units and a set of hard disk drive (HDD) memory units within the home storage system; an external interface management and monitoring module for managing and monitoring network connectivity of the home storage system; and a portable storage management and monitoring module for managing and monitoring at least one type of external memory coupled to the home storage system.

A first aspect of the present invention provides a home storage system, comprising: a main controller coupled to a display controller, an external memory controller, an external interface, and a hybrid RAID controller; a set of semiconductor storage device (SSD) memory units coupled to the hybrid RAID controller; and a set of hard disk drive (HDD) memory units coupled to the hybrid RAID controller.

A second aspect of the present invention provides a home storage system, comprising: a main controller; a display controller coupled to the main controller for controlling a display; an external memory controller coupled to the main controller for interfacing with an external memory device; an external interface coupled to the main controller for interfacing with a network; a PCI-Express-based hybrid RAID controller coupled to the main controller; a set of semiconductor storage device (SSD) memory units coupled to the hybrid RAID controller; and a set of hard disk drive (HDD) memory units coupled to the hybrid RAID controller.

A third aspect of the present invention provides a method for producing a home storage system, comprising: coupling a main controller to a display controller, an external memory controller, an external interface, and a hybrid RAID controller; coupling a set of semiconductor storage device (SSD) memory units to the hybrid RAID controller; and coupling a set of hard disk drive (HDD) memory units to the hybrid RAID controller.

BRIEF DESCRIPTION OF THE DRAWINGS

These and other features of this invention will be more readily understood from the following detailed description of the various aspects of the invention taken in conjunction with the accompanying drawings in which.

Figure 1:
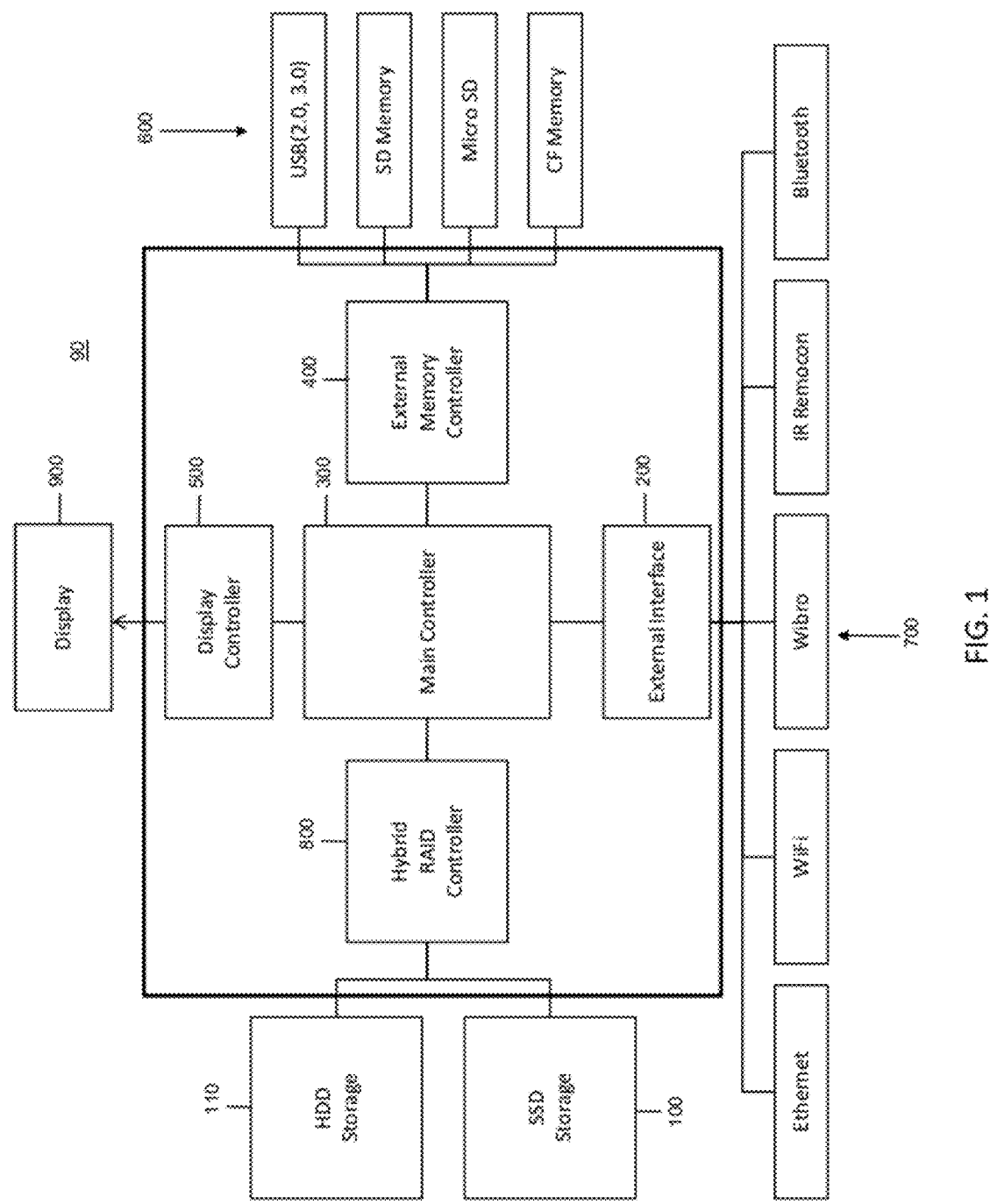
FIG. 1 is a diagram schematically illustrating a configuration of a hybrid RAID controlled home storage system.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:
I. General Description
II. Hardware Implementation
III. Software Implementation I. General Description Exemplary embodiments will be described more fully herein with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limited to this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Moreover, as used herein, the term RAID means redundant array of independent disks (originally redundant array of inexpensive disks). In general, RAID technology is a way of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance.

Unless otherwise defined, all terms (including technical and scientific terms) used herein have the same meaning as commonly understood by one of ordinary skill in the art. It will be further understood that terms such as those defined in commonly used dictionaries should be interpreted as having a meaning that is consistent with their meaning in the context of the relevant art and the present disclosure, and will not be interpreted in an idealized or overly formal sense unless expressly so defined herein.

Hereinafter, a RAID storage device of a PCI-Express (PCI-e) type according to an embodiment will be described in detail with reference to the accompanying drawings.

As indicated above, In general, embodiments of the present invention provide a home storage system. Specifically, in a typical embodiment, the home storage system includes a graphical user interface for graphically accessing features of the home storage system; an internal storage management and monitoring module for managing and monitoring a set of semiconductor storage device (SSD) memory units and a set of hard disk drive (HDD) memory units within the home storage system; an external interface management and monitoring module for managing and monitoring network connectivity of the home storage system; and a portable storage management and monitoring module for managing and monitoring at least one type of external memory coupled to the home storage system.

The storage device of a PCI-Express (PCI-e) type supports a low-speed data processing speed for a host by adjusting synchronization of a data signal transmitted/received between the host and a memory disk during data communications between the host and the memory disk through a PCI-Express interface, and simultaneously supports a high-speed data processing speed for the memory disk, thereby supporting the performance of the memory to enable high-speed data processing in an existing interface environment at the maximum. It is understood in advance that although PCI-Express technology will be utilized in a typical embodiment, other alternatives are possible. For example, the present invention could utilize SAS/SATA technology in which a SAS/SATA type storage device is provided that utilizes a SAS/SATA interface.

II. Hardware Implementation

Referring now to FIG. 1, a diagram schematically illustrating a configuration of a PCI-Express type, hybrid RAID controlled home storage device/system 90 is shown. FIG. 1 shows a hybrid RAID controlled PCI-Express type storage device according to an embodiment of the invention which includes a set (at least one) of high speed semiconductor storage device (SSD memory units 100) and a set of high density disks (HDD memory units 110). Specifically, as shown, a main controller 300 is coupled to a hybrid RAID controller 800, which itself is coupled to SDD memory units 100 and HDD memory units 110. Main controller 300 is also coupled to: an external interface 200 that provides connectivity to external devices and/or one or more networks 700; an external memory controller 400 for coupling to a set of external memory devices 600; and a display controller 500 for coupling to a display 900;

The SSD memory unit 100 includes a plurality of memory disks provided with a plurality of volatile semiconductor memories for high-speed data input/output (for example, DDR, DDR2, DDR3, SDRAM, and the like), and inputs and outputs data according to the control of the controller 300. The SSD memory unit 100 may have a configuration in which the memory disks are arrayed in parallel. Moreover, SSD memory unit 100 is typically a separate disk, and is utilized by host application. Along these lines SSD memory unit 100 can be implemented as a buffer, a cache, disk space, and/or memory space for a server.

HDD memory unit 110 can: comprise an array (e.g. 8 SATA drives); can be "hot swappable"; can provide unit-based access+RAID (with conversion); and can provide progress recovery capability and progressive integration of new HDD memory units 110. The functionality of hybrid RAID controller 800 can provide progressive hot swapping. Scenario: A user couples a HDD memory unit 110 to hybrid RAID controller 800. The HDD memory unit 110 will join the RAID progressively. That is, it is integrated into the RAID system linearly to maintain system availability. In addition, RAID progressive recovery can also be provided hereunder. Scenario: A user decouples a HDD memory unit 110 from hybrid RAID controller 100. In this case, a server will progressively reconstruct the RAID. As such, system accessibility is maintained while the RAID recovers linearly. Still yet, the embodiments described herein accommodate unit-based access vs. RAID conversion. Scenario: Two HDD memory units 110 are accessed as individual units (separate drives), and six HDD memory units 110 are RAID'd. Assume that a user wishes to add one HDD memory unit 110 to the RAID, or the user wishes to remove one HDD memory unit 110 from the RAID to make it a separate unit. Conversion is rapid, transparent, and progressively linear. In addition, the embodiments discussed herein provide differential RAID. That is, HDD memory units 110 and SSD memory units 100 are RAID'd (i.e., controlled by hybrid RAID controller 800) differentially in one RAID system. Frequently accessed files or anticipated file blocks can be cached/moved to SSD memory units 100.

Figure 2:
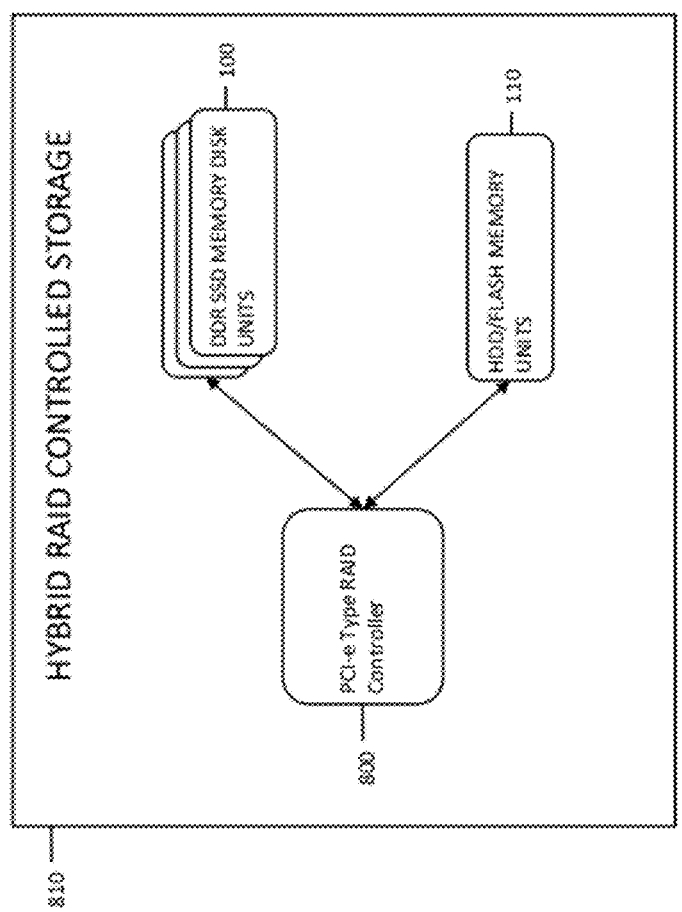
FIG. 2 is a more specific diagram of a hybrid RAID controller coupled to a set of SSD memory units and HDD memory units.

Referring now to FIG. 2, a more detailed diagram of a hybrid RAID controlled storage 810 is shown. As depicted, a PCI-e type RAID controller 800 can be directly coupled to any quantity of SSD memory units 100 and HDD/flash memory units 110. Among other things, this allows for optimum control of SSD memory units 100 and HDD memory units 110.

Figure 3:
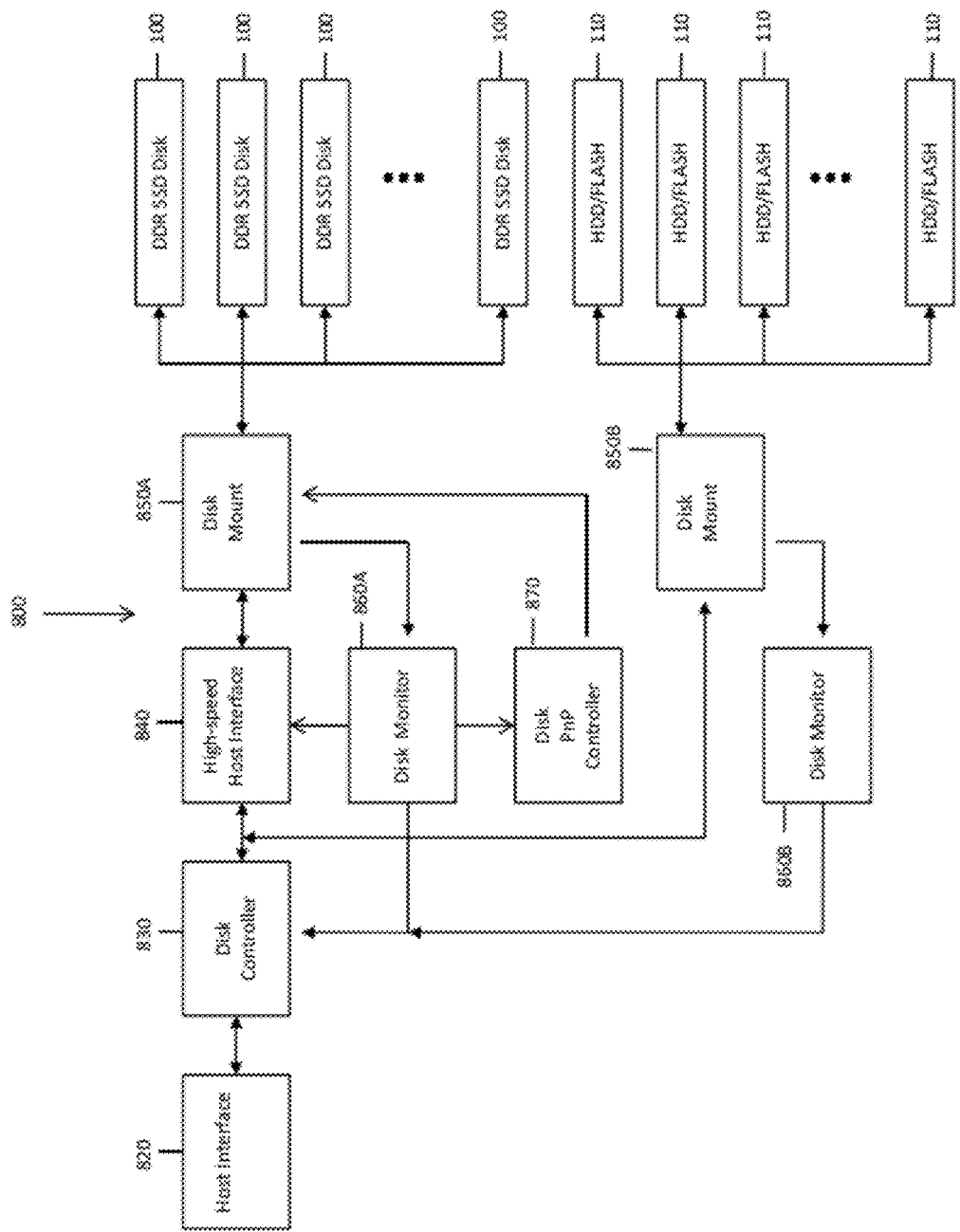
FIG. 3 is a diagram schematically illustrating the hybrid RAID controller of FIGS. 1 and 2.

Referring now to FIG. 3, a diagram of the hybrid RAID controller 800 of FIGS. 1 and 2 as coupled to a set (at least one) of SSD memory units 100 and a set of HDD/flash memory units 110 is shown in greater detail. As depicted, hybrid RAID controller 800 generally comprises: a host interface 820; a disk controller 830 coupled to host interface 820; and a high-speed host interface 840. Also coupled to disk controller 830 is a first disk monitoring unit 860A, which is coupled to the first disk mount 850A. In general, SSD memory units 100 are mounted on first disk mount 850A and are detected by first disk monitoring unit 860A. Still yet, shown coupled to disk controller 830 is a second disk monitoring unit 860B, which is coupled to a second disk mount 850B. In general, HDD/Flash memory units 110 are mounted on second disk mount 850B and are detected by second disk monitoring unit 860B. Disk plug and play (PnP controller 870) controls the functions and/or detection functions related to first disk mount 850A and second disk mount 850B. In general, hybrid RAID controller 800 controls the operation of SSD memory units 100 and HDD/Flash memory units 110. This includes the detection of SSD memory units 100 and HDD/Flash memory units 110, the storage and retrieval of data therefrom, etc.

Figure 4:
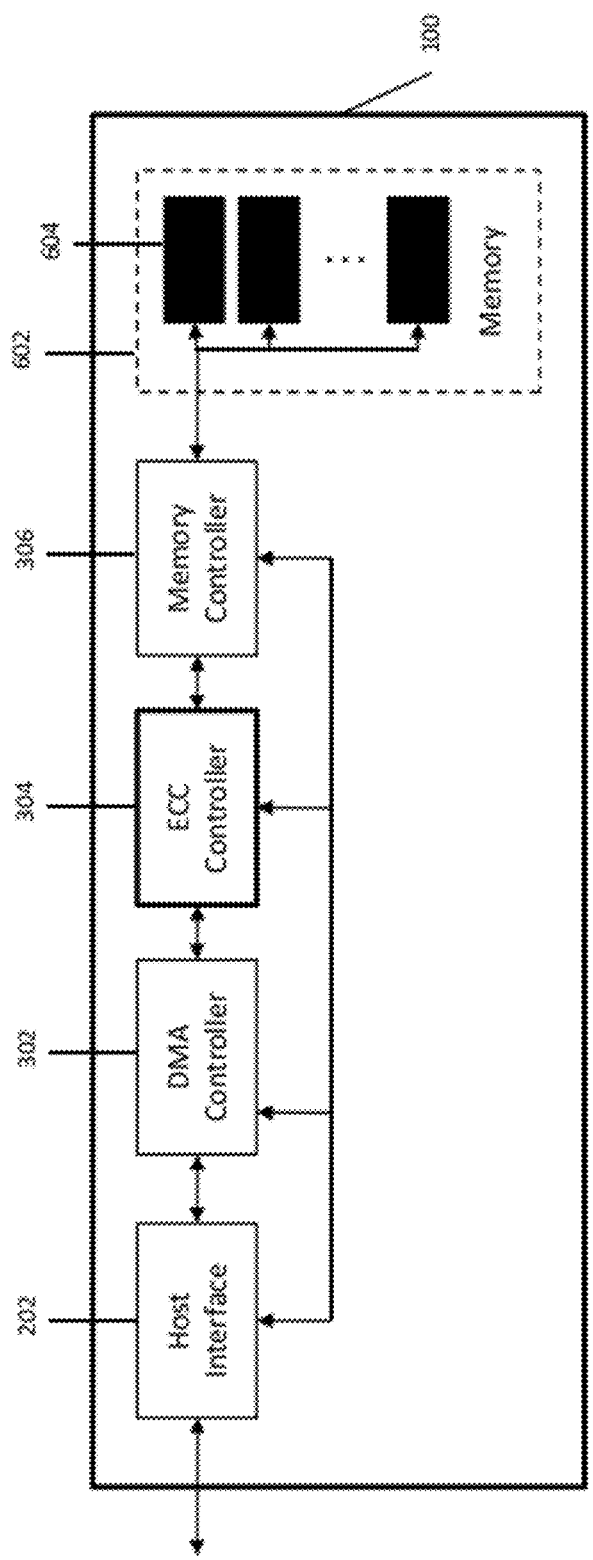
FIG. 4 is a diagram schematically illustrating a configuration of the high speed SSDs of FIG. 1.

Referring now to FIG. 4, a diagram schematically illustrating a configuration of the high speed SSD 100 is shown. As depicted, SSD memory unit 100 comprises: a host interface 202 (e.g., PCI-Express host) (which can be interface 200 of FIG. 1, or a separate interface as shown); a DMA controller 302; an ECC controller 304; and a memory controller 306 for controlling one or more blocks 604 of memory 602 that are used as high speed storage.

Figure 5:
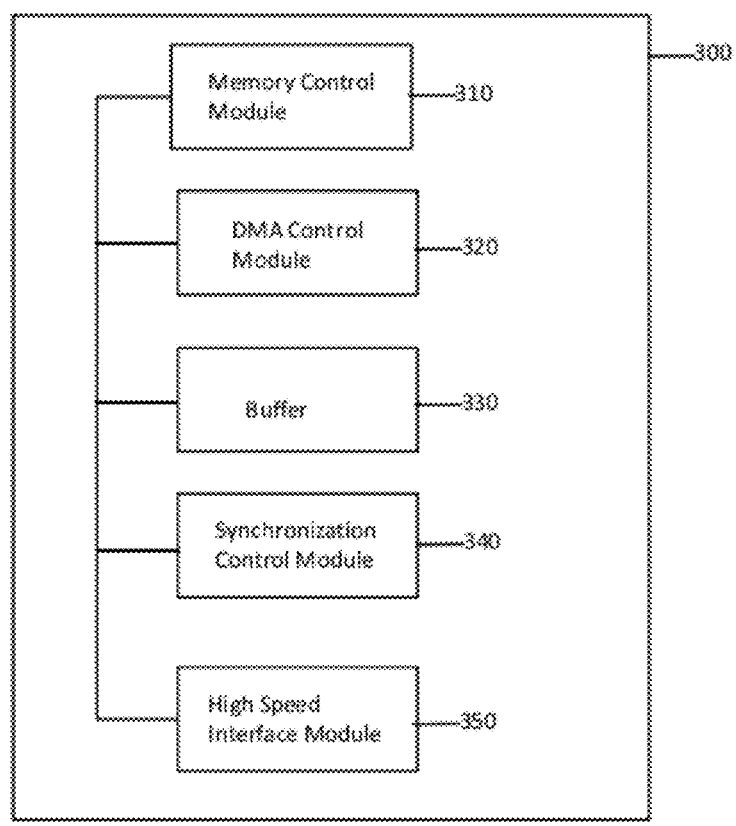
FIG. 5 is a diagram schematically illustrating the main controller of FIG. 1.

FIG. 5 is a diagram schematically illustrating one possible configuration of main controller 300 provided in the PCI-Express type home storage system/device according to the embodiments discussed herein. Referring to FIG. 5, the main controller 300 according to the embodiment includes: a memory control module 310 which controls data input/output of the memory unit 100; a DMA (Direct Memory Access) control module 320 which controls the memory control module 310 to store the data in the memory unit 100, or reads data from the memory units 100 and/or 110 to provide the data to the host, according to an instruction from the host received through the PCI-Express host interface unit 200; a buffer 330 which buffers data according to the control of the DMA control module 320; a synchronization control module 340 which, when receiving a data signal corresponding to the data read from the memory unit 100 by the control of the DMA control module 320 through the DMA control module 320 and the memory control module 310, adjusts synchronization of a data signal so as to have a communication speed corresponding to a PCI-Express communications protocol to transmit the synchronized data signal to a PCI-Express host interface unit (not shown), and when receiving a data signal from the host through the PCI-Express host interface unit, adjusts synchronization of the data signal so as to have a transmission speed corresponding to a communications protocol (for example, PCI, PCI-x, or PCI-e, and the like) used by the memory units 100 and/or 110 to transmit the synchronized data signal to the memory units 100 and/or 110 through the DMA control module 320 and the memory control module 310; and a high-speed interface module 350 which processes the data transmitted/received between the synchronization control module 340 and the DMA control module 320 at high speed. Here, the high-speed interface module 350 includes a buffer having a double buffer structure and a buffer having a circular queue structure and processes the data transmitted/received between the synchronization control module 340 and the DMA control module 320 without loss at high speed by buffering the data transmitted/received between the synchronization control module 340 and the DMA control module 320 using the buffers and adjusting data clocks.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

The RAID controlled storage device of a PCI-Express (PCI-e) type supports a low-speed data processing speed for a host by adjusting synchronization of a data signal transmitted/received between the host and a memory disk during data communications between the host and the memory disk through a PCI-Express interface and simultaneously supports a high-speed data processing speed for the memory disk, thereby supporting the performance of the memory to enable high-speed data processing in an existing interface environment at the maximum.

III. Software Implementation

Figure 6:
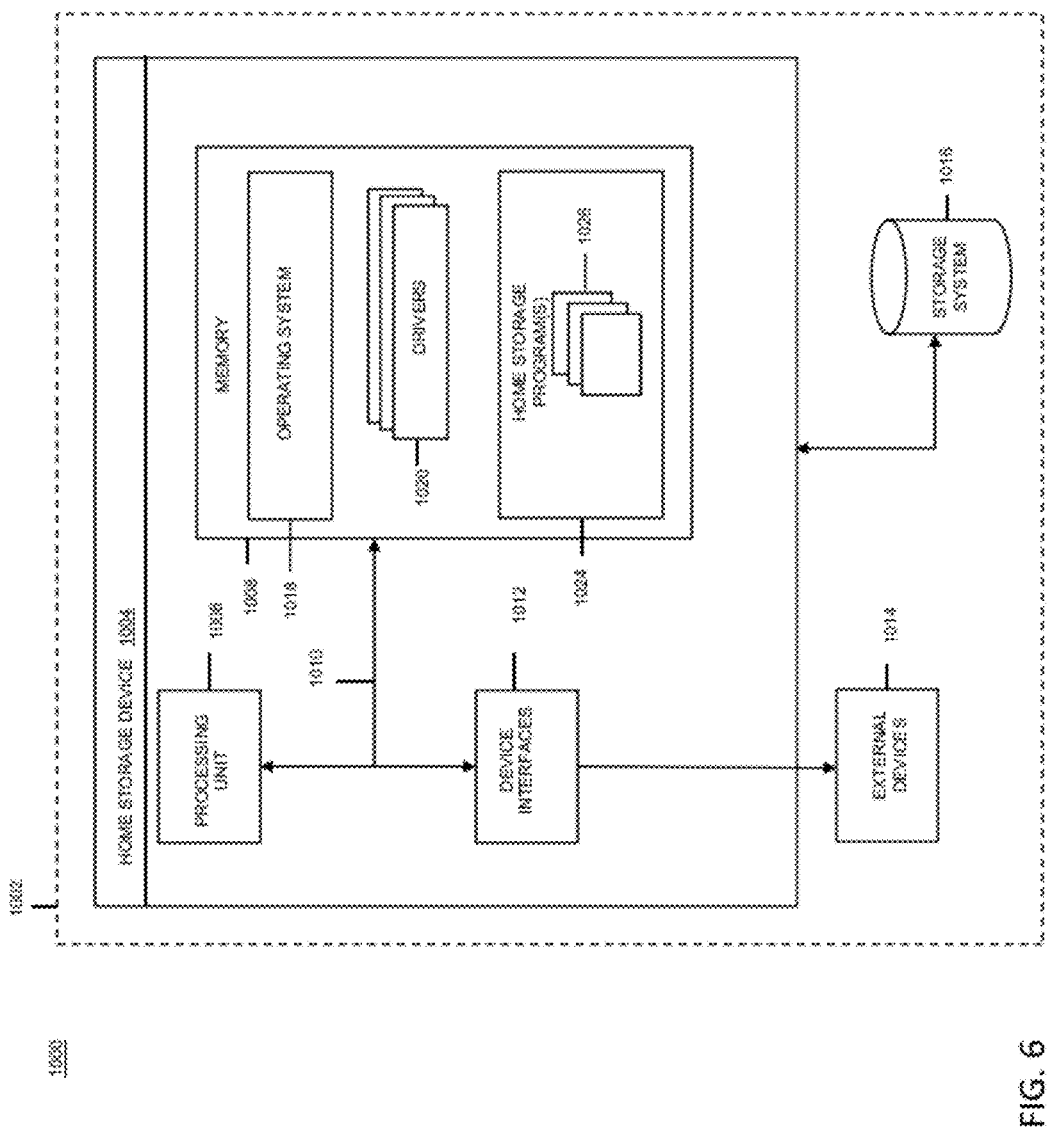
FIG. 6 is a diagram schematically illustrating a computerized implementation of the present invention.

Referring now to FIG. 6, a computerized implementation 1000 of the present invention is shown. As depicted, implementation 1000 includes home storage device 1004 deployed within a computer infrastructure 1002. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 1002 is intended to demonstrate that some or all of the components of implementation 1000 could be deployed, managed, serviced, etc. by a service provider who offers to implement, deploy, and/or perform the functions of the present invention for others.

Home storage device 1004 is intended to represent any type of computer system that may be implemented in deploying/realizing the teachings recited herein. It should be understood that any other computers implemented under the present invention will have similar components, but may perform different functions/have different software. As shown, home storage device 1004 includes a processing unit 1006, a memory 1008, a bus 1010, and device interfaces 1012. Further, home storage device 1004 is shown communicating with one or more external devices 1014 that communicate with bus 1010 via device interfaces. In general, processing unit 1006 executes computer program code, such as software programs 1024 and/or modules 1026, which is stored in memory 1008 and/or storage system 1016. While executing computer program code, processing unit 1006 can read and/or write data to/from memory 1008, storage system 1016, and/or device interfaces 1012. Bus 1010 provides a communication link between each of the components in home storage device 1004. Although not shown, home storage device 1004 could also include I/O interfaces that communicate with: one or more external devices 1014 (such as a keyboard, a pointing device, a display, etc.); one or more devices that enable a user to interact with home storage device 1004; and/or any devices (e.g., network card, modem, etc.) that enable home storage device 1004 to communicate with one or more other computing devices. Although not shown, home storage device 1004 could contain multiple processing units.

Computer infrastructure 1002 is only illustrative of various types of computer infrastructures for implementing the invention. For example, in one embodiment, computer infrastructure 1002 comprises two or more computing devices (e.g., a server cluster) that communicate over a network to perform the various processes of the invention. Moreover, home storage device 1004 is only representative of various possible computer systems that can include numerous combinations of hardware. To this extent, in other embodiments, home storage device 1004 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 1006 may comprise a single processing unit, or be distributed across one or more processing units in one or more locations (e.g., on a client and server). Similarly, memory 1008 and/or storage system 1016 can comprise any combination of various types of data storage and/or transmission media that reside at one or more physical locations. Further, device interfaces 1012 can comprise any module for exchanging information with one or more external devices. Still further, it is understood that one or more additional components (e.g., system software, math co-processing unit, etc.) not shown in FIG. 6 can be included in home storage device 10004.

Storage system 1016 can be any type of system capable of providing storage for information under the present invention. To this extent, storage system 1016 could include one or more storage devices such as magnetic disk drive or an optical disk drive. In another embodiment, storage system 1016 includes data distributed across, for example, a local area network (LAN), wide area network (WAN) or a storage area network (SAN) (not shown). In addition, although not shown, additional components, such as cache memory, communication systems, system software, etc., may be incorporated into home storage device 10004.

It is understood that home storage device 1004 can also include and/or couple to the components of home storage system 90 shown in FIG. 1 (e.g., controllers (300, 400, 500, and 800), eternal interface 200, external memory devices 600, SDD memory units 100, HDD memory units 110, etc.). Such components have not been depicted in FIG. 7 for brevity purposes only. Shown in memory 1008 of home storage device 1004 are operating system 1018, drivers 1020, and home storage program(s) 1024 having a set (i.e., at least one) of modules 1026. Set of modules 1026 generally work in conjunction with the components shown in FIGS. 1 and 6, and provide the functions of the present invention as will be described below in conjunction with FIG. 7.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Figure 7:
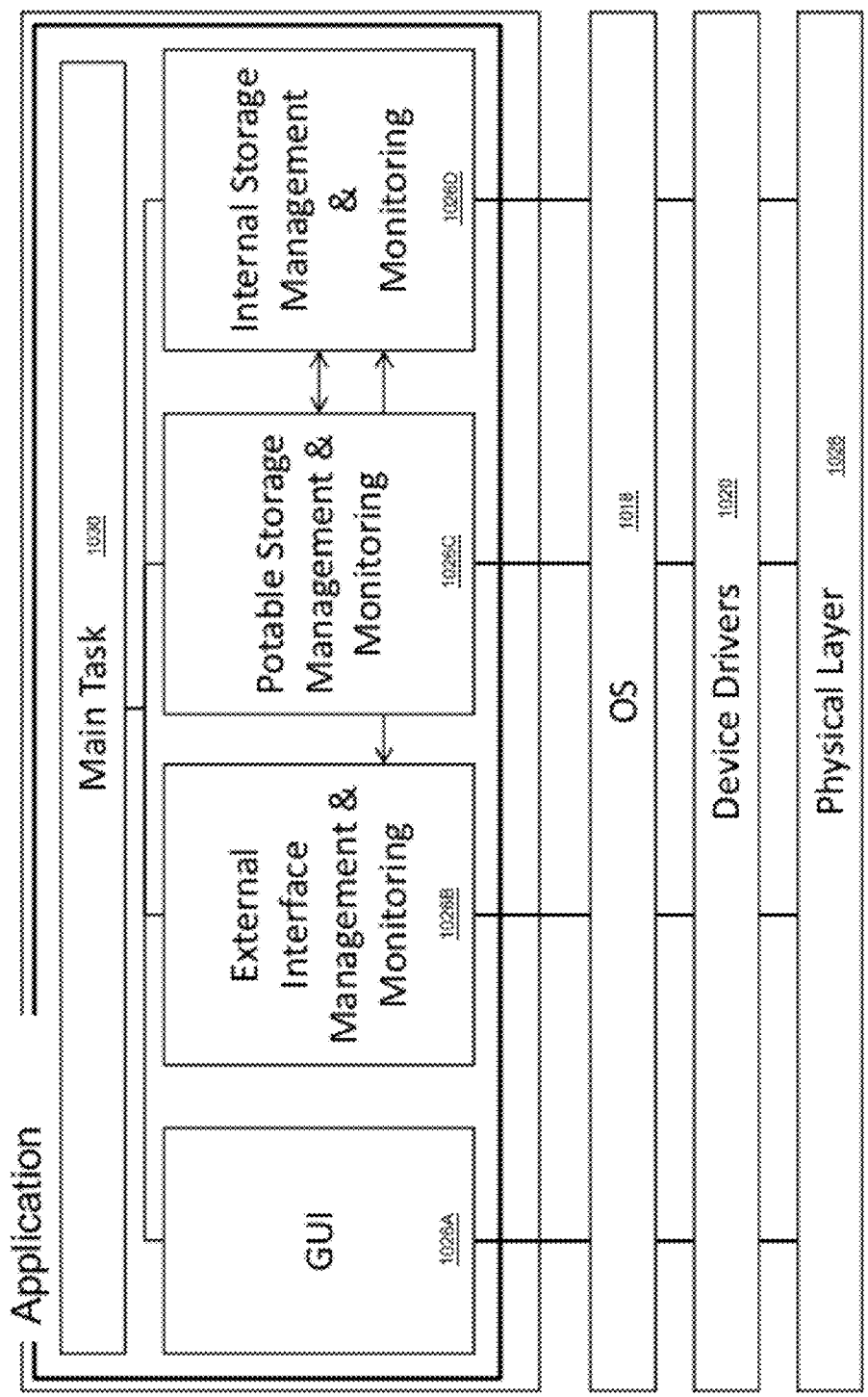
FIG. 7 is a diagram schematically illustrating a software implementation of the present invention.

Referring now to FIG. 7, the functions of the various pieces of software provided hereunder will be explained in greater detail. As shown, home storage device 1000 includes a physical layer 1030 (e.g., that comprises the component shown in FIG. 1 and/or FIG. 7), device drivers 1020, an operating system 1018, modules 1026A-D, and a main task system 1030. In general, modules 1026A-D working in conjunction with the elements (e.g., controllers 300, 400, 500 and 800, as well as external interface 200, to provide the functionality supported thereby). In general, modules 1026A-D have the following functions:

Graphical user interface (GUI) 1026A allows a user to graphically access features and/or control of the home storage system/device.

External interface management and monitoring module 1026B works in conjunction with the external interface 200 of FIG. 1 to manage and monitor network connectivity of the home storage system/device 90/1000. External interface management and monitoring unit can also work in conjunction with display controller 500 of FIG. 1 to couple home storage system/device to a display 900. This module 1026B can also work in conjunction with device interfaces 1012 of FIG. 6 to provide this functionality.

Portable storage management and monitoring module 1026C works in conjunction with the external memory controller 400 of FIG. 1 to manage and monitor at least one type of external memory coupled to the home storage system/device.

Internal storage management and monitoring module 1026D works in conjunction with the hybrid RAID controller 800 of FIG. 1 to manage and monitor a set of semiconductor storage device (SSD) memory units and a set of hard disk drive (HDD) memory units within the home storage system/device.

While shown and described herein as a home storage device and software, it is understood that the invention further provides various alternative embodiments. For example, in one embodiment, the invention provides a computer-readable/useable medium that includes computer program code to enable a computer infrastructure to provide a home storage device and software. To this extent, the computer-readable/useable medium contains program code that implements each of the various processes of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 1008 (FIG. 6) and/or storage system 1016 (FIG. 6) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide home storage device and software. In this case, the service provider can create, maintain, support, etc., a computer infrastructure, such as computer infrastructure 1002 (FIG. 6) that performs the process of the invention for one or more customers. In return, the service provider can receive payment from the customers under a subscription and/or fee agreement and/or the service provider can receive payment from the sale of advertising content to one or more third parties.

In still another embodiment, the invention provides a computer-implemented method for a home storage device and software. In this case, a computer infrastructure, such as computer infrastructure 1002 (FIG. 6), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as home storage device 1004 (FIG. 6), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

I claim:

1. A home storage system, comprising:
 a graphical user interface for graphically accessing features of the home storage system;
 an internal storage management and monitoring module for managing and monitoring a set of semiconductor storage device (SSD) memory units and a set of hard disk drive (HDD) memory units within the home storage system;
 an external interface management and monitoring module for managing and monitoring network connectivity of the home storage system; and
 a portable storage management and monitoring module for managing and monitoring at least one type of external memory coupled to the home storage system
 wherein the set of SDD memory units and the set of HDD memory units are coupled to a hybrid RAID controller,
 wherein the hybrid RAID controller comprises:
 a first disk mount coupled to the set of SSD memory units;
 a first disk monitoring unit coupled to the first disk mount for monitoring the set of SSD memory units;
 a disk plug and play controller coupled to the first disk monitoring unit and the first disk mount for controlling the disk mount;
 a high speed host interface coupled to the first disk monitoring unit and the first disk mount for providing high-speed host interface capabilities;
 a second disk mount coupled to the set of HDD memory units; and
 a second disk monitoring unit coupled to the second disk mount for monitoring the set of HDD memory units.

2. The home storage system of claim 1, the hybrid RAID controller further
 comprising a disk controller coupled to the high speed host interface, the first disk monitoring unit and the second disk monitoring unit.

3. The home storage system of claim 2, the hybrid RAID controller further comprising a host interface coupled to the disk controller.

4. The home storage system of claim 1, the hybrid RAID controller being PCI-Express-based.

5. The home storage system of claim 1:
 the external interface and monitoring module working in conjunction with an external interface of the home storage system;

the portable storage managing and monitoring module working in conjunction with an external memory controller of the home storage system;

the internal storage management and monitoring module working in conjunction with the hybrid RAID controller of the home storage system; and the hybrid RAID controller, the external memory controller, and the external interface being coupled to a main controller of the home storage system.

6. The home storage system of claim 1, the set of SDD memory units comprising a set of volatile semiconductor memories.

7. At least one computer program product for a home storage system, the at least one computer program product comprising a non-transitory computer readable storage medium, and program instructions stored on the computer readable storage medium, to:

graphically access features of the home storage system;

manage and monitor a set of semiconductor storage device (SSD) memory units and a set of hard disk drive (HDD) memory units within the home storage system;

establish, manage, and monitor network connectivity of the home storage system; and manage and monitor at least one type of external memory coupled to the home storage system;

wherein the set of SDD memory units and the set of HDD memory units are coupled to a hybrid RAID controller, wherein the hybrid RAID controller comprises:

a first disk mount coupled to the set of SSD memory units;

a first disk monitoring unit coupled to the first disk mount for monitoring the set of SSD memory units;

a disk plug and play controller coupled to the first disk monitoring unit and the first disk mount for controlling the disk mount;

a high speed host interface coupled to the first disk monitoring unit and the first disk mount for providing high-speed host interface capabilities;

a second disk mount coupled to the set of HDD memory units; and a second disk monitoring unit coupled to the second disk mount for monitoring the set of HDD memory units.

8. The at least one computer program product of claim 7, the hybrid RAID controller further comprising a disk controller coupled to the high speed host interface, the first disk monitoring unit and the second disk monitoring unit.

9. The at least one computer program product of claim 8, the hybrid RAID controller further comprising a host interface coupled to the disk controller.

10. The at least one computer program product of claim 7, the hybrid RAID controller being PCI-Express-based.

11. The at least one computer program product of claim 7, the set of SSD memory units comprising a set of volatile semiconductor memories.

12. A home storage method, comprising:

graphically accessing features of the home storage system;

managing and monitoring a set of semiconductor storage device (SSD) memory units and a set of hard disk drive (HDD) memory units within the home storage system;

managing and monitoring network connectivity of the home storage system; and managing and monitoring at least one type of external memory coupled to the home storage system;

wherein the set of SDD memory units and the set of HDD memory units are coupled to a hybrid RAID controller, wherein the hybrid RAID controller comprises:

a first disk mount coupled to the set of SSD memory units;

a first disk monitoring unit coupled to the first disk mount for monitoring the set of SSD memory units;

a disk plug and play controller coupled to the first disk monitoring unit and the first disk mount for controlling the disk mount;

a high speed host interface coupled to the first disk monitoring unit and the first disk mount for providing high-speed host interface capabilities;

a second disk mount coupled to the set of HDD memory units; and a second disk monitoring unit coupled to the second disk mount for monitoring the set of HDD memory units.

13. The home storage method of claim 12, the hybrid RAID controller further comprising a disk controller coupled to the high speed host interface, the first disk monitoring unit and the second disk monitoring unit.

14. The home storage method of claim 13, the hybrid RAID controller further comprising a host interface coupled to the disk controller.

* * * * *